US009304682B2

(12) United States Patent
Hoyer et al.

(10) Patent No.: US 9,304,682 B2
(45) Date of Patent: *Apr. 5, 2016

(54) CREATION AND MANIPULATION OF CANVASES BASED ON INK STROKES

(75) Inventors: Crystal L. Hoyer, Redmond, WA (US); Clifton W. Owen, Kirkland, WA (US); Howard L. Cooperstein, Merlo Park, CA (US); Steven A. Breinberg, Cupertino, CA (US); Guem R. Kim, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 544 days.

This patent is subject to a terminal disclaimer.

(21) Appl. No.: 12/843,071

(22) Filed: Jul. 26, 2010

(65) Prior Publication Data

US 2010/0289820 A1   Nov. 18, 2010

Related U.S. Application Data

(63) Continuation of application No. 11/343,842, filed on Jan. 31, 2006, now Pat. No. 7,774,722.

(51) Int. Cl.
   *G06F 3/033*  (2013.01)
   *G06F 3/0488*  (2013.01)

(52) U.S. Cl.
   CPC .................................. *G06F 3/04886* (2013.01)

(58) Field of Classification Search
   CPC ..................................................... G06F 3/0484
   USPC ................................................. 715/760, 863
   See application file for complete search history.

(56) References Cited

U.S. PATENT DOCUMENTS

| 5,511,148 | A  | 4/1996  | Wellner |
| 6,011,536 | A  | 1/2000  | Hertzmann et al. |
| 6,282,315 | B1 | 8/2001  | Boyer |
| 6,509,912 | B1 | 1/2003  | Moran et al. |
| 6,651,221 | B1 | 11/2003 | Thompson et al. |
| 6,870,550 | B1 | 3/2005  | Schuster et al. |
| 7,120,872 | B2 | 10/2006 | Thacker |
| 7,774,722 | B2 | 8/2010  | Hoyer et al. |

(Continued)

FOREIGN PATENT DOCUMENTS

WO   WO 93/08559   4/1993

OTHER PUBLICATIONS

"Q&A with Engineering"; 5 pgs., http://www.deneba.com/international/gcansas/canvas9/interview.html.

(Continued)

*Primary Examiner* — Sara England
(74) *Attorney, Agent, or Firm* — Danielle Johnston Holmes; Damon Rieth; Micky Minhas

(57) ABSTRACT

A canvas in an inking application is created and manipulated based on ink strokes. An ink stroke outside a presented canvas, even outside a user interface of the inking application, is recorded and the presented canvas enlarged to cover the recorded ink stroke. If the ink stroke begins on a command area such as a canvas size control icon, the command associated with the area is executed. If the ink stroke begins in a typed text area, lines are frozen and separated responsive to the first stroke. A new canvas is presented between the separated lines. A size of the new canvas is adjusted based on ink entry or a size of the first ink stroke.

20 Claims, 10 Drawing Sheets

(56) References Cited

U.S. PATENT DOCUMENTS

| | | |
|---|---|---|
| 2002/0059350 A1 | 5/2002 | Iwema et al. |
| 2002/0149630 A1 | 10/2002 | Kitainik et al. |
| 2002/0152240 A1 | 10/2002 | Kitainik et al. |
| 2003/0214531 A1 | 11/2003 | Chambers et al. |
| 2003/0214553 A1 | 11/2003 | Gounares et al. |
| 2003/0215140 A1 | 11/2003 | Gounares et al. |
| 2003/0215142 A1 | 11/2003 | Gounares et al. |
| 2003/0217336 A1 | 11/2003 | Gounares et al. |
| 2004/0001627 A1* | 1/2004 | Simmons et al. ............ 382/186 |
| 2004/0140964 A1 | 7/2004 | Wang et al. |
| 2004/0237033 A1 | 11/2004 | Woolf et al. |
| 2005/0108640 A1 | 5/2005 | Thacker |
| 2005/0114773 A1 | 5/2005 | Thacker |
| 2005/0244058 A1 | 11/2005 | Gorbatov et al. |
| 2007/0180397 A1 | 8/2007 | Hoyer et al. |

OTHER PUBLICATIONS

"*Software for the Tablet PC*"; 10 pgs.; http://tabletpc2.com/Software.htm.

"*Introducing Corel Grafigo 2*"; 15 pgs.; Reviews Guide; 2003 Corel Corporation.

\* cited by examiner

CREATION AND MANIPULATION OF CANVASES BASED ON INK STROKES

RELATED APPLICATIONS

This application is a Continuation of co-pending U.S. application Ser. No. 11/343,842 entitled "Creation and Manipulation of Canvases Based on Ink Strokes" filed Jan. 31, 2006, which is incorporated herein by reference.

BACKGROUND

Some computing devices allow users to enter characters and symbols in handwriting on a special writing area using ink strokes as opposed to a keyboard entry. The handwriting can be used as is (e.g., to function as readable notes and so forth) or can be converted to text for more conventional computer uses. To convert to text, for example, as a user writes onto a touch-sensitive computer screen, a touchpad, or the like, a handwriting recognizer is able to convert the handwriting data into dictionary words or symbols. In this manner, users are able to enter textual or graphical data without necessarily needing a keyboard.

The special writing areas are sometimes referred to as canvases. A canvas may be dedicated to ink entry, or mixed use (includes typed text or graphics as well as inked entry). A canvas in itself may be a way to mitigate certain problems such as creating white space to move text out of the way of ink entry, preserving reflow of text, and the like.

It is difficult, however, for users to manipulate and work with canvases to add ink or open additional canvases in text-based applications. For example, ink strokes may be cropped if they are drawn outside of the bounds of a canvas, users may not be able to dynamically insert a canvas in line with text.

SUMMARY

A canvas in an inking application may be created and manipulated based on ink strokes. If an ink stroke is detected outside a presented canvas, it is recorded and the presented canvas enlarged to cover the recorded ink stroke. If the ink stroke begins on a command area, the command associated with the area is determined and executed. If the ink stroke begins in a typed text area, lines are frozen and separated responsive to the first stroke. A new canvas is presented between the separated lines. A size of the new canvas is adjusted based on ink entry or a size of the first ink stroke.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

The term "inking canvas" or "canvas" refers to a defined area within a presentation of a text-based or graphics application, such as a word processing application, a slide presentation application, a graphic design application, and the like, where text, symbols, and graphics may be entered by a user employing a device such as an "inking pen", a "stylus", a mouse, a pointer, and the like, instead of using a standard keyboard. The terms are not intended to convey a limiting definition, and other terms may be used to describe the same.

Figure 1:
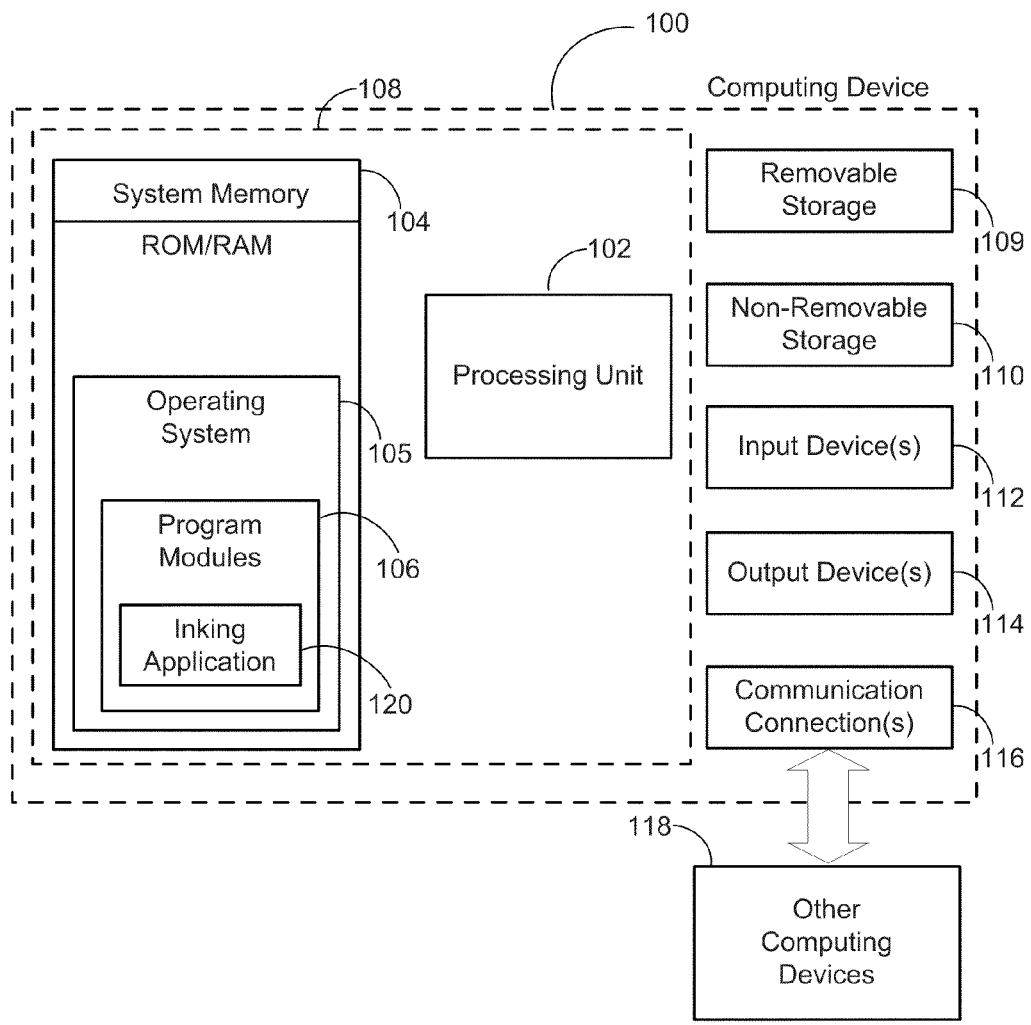
FIG. 1 illustrates a computing device in which an inking application may be executed using borderless canvases and manipulation of canvases based on ink strokes.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105 and one or more program modules 106 working within operating system 105.

Program modules 106 may include inking application 120, which may also be executed separately within operating system 105. Inking application 120 may include any text-based application such as a word processing application, a presentation application, a spreadsheet application, an electronic mail application, a graphic design application, and the like, with inking capability. Inking capability refers to a feature of the application providing a user to enter characters, symbols, and graphics using a stylus instead of a keyboard.

To perform the actions described above, inking application 120 may include and/or interact with other computing devices, applications, and application interfaces (APIs) residing in other applications. For example, an electronic mail application with inking capability may accept handwritten entries, combine them with typed text, and perform typical electronic mail actions such as sending and receiving messages, scheduling appointments, and the like.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included. To execute an inking application computing device 100 typically includes a touch-sensitive display that detects ink strokes from an inking pen or stylus, essentially acting as an input device.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
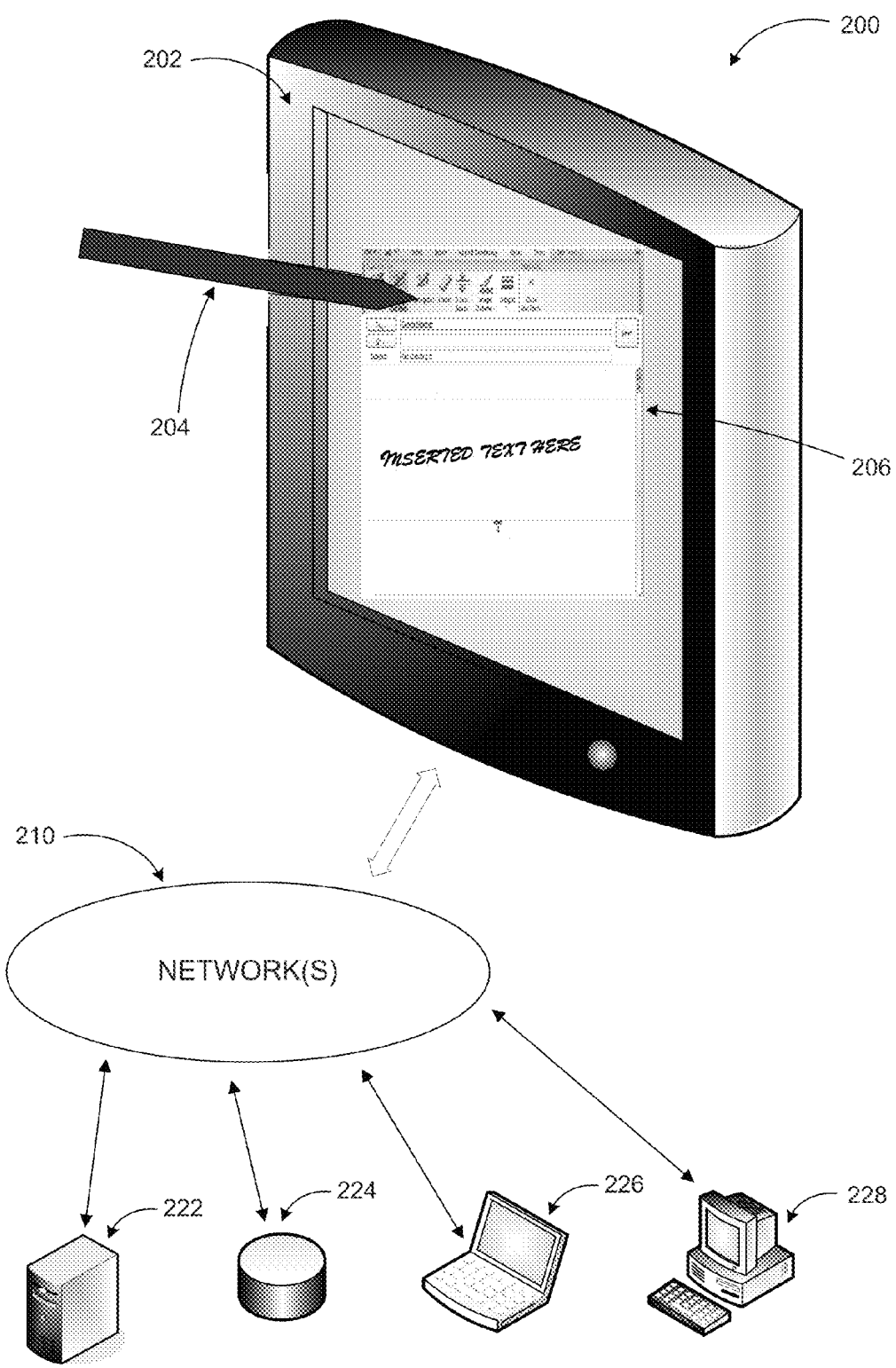
FIG. 2 illustrates a system, where example embodiments of an inking application may be implemented.

FIG. 2 illustrates system 200, where example embodiments of creating and manipulating canvas areas based on ink strokes may be implemented. System 200 may comprise any topology of servers, clients, Internet service providers, and communication media. Also, system 200 may have a static or dynamic topology.

Inking application 206 may be executed on computing device 202 that is configured to accept ink entries by an inking device such as stylus 204. Computing device 202 may be a Tablet PC, a Personal Digital Assistant (PDA), or any computing device with inking capability. Inking application 206 may be run centrally on computing device 202 or in a distributed manner over several computing devices managed by one or more servers (e.g. server 222). Computing device 202 may communicate with other computing devices such as laptop PC 226, desktop PC 228, and the like, over network(s) 210 as part of the operation of inking application 206.

Moreover, any computing device associated with the inking application may store data at or receive data from data store 224. In an example embodiment, inking application 206 may be an electronic mail application accepting inked entry for messages, and the like. Inking application 206 may retrieve data such as attachments from data store 224 and send the message(s) to laptop PC 226. Server 222 may manage the electronic mail operations such as addressing, encryption/decryption, and the like.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

As described above, inking application 206 may include any application that receives an entry from an inking device such as described previously. The inking device entries may be made on a display of a computing device, on a touch pad, and the like. Inking entries are then interpreted by the inking application to generate text or graphics, execute commands, modify settings, and the like. Inking application 206 may include a graphical representation application, a spreadsheet application, a graphic design application, a communications application, an alerting application, a word processing application, and the like.

Many other configurations of computing devices, applications, data sources, and systems may be employed to implement creation and manipulation of canvases based on ink strokes.

Figure 3:
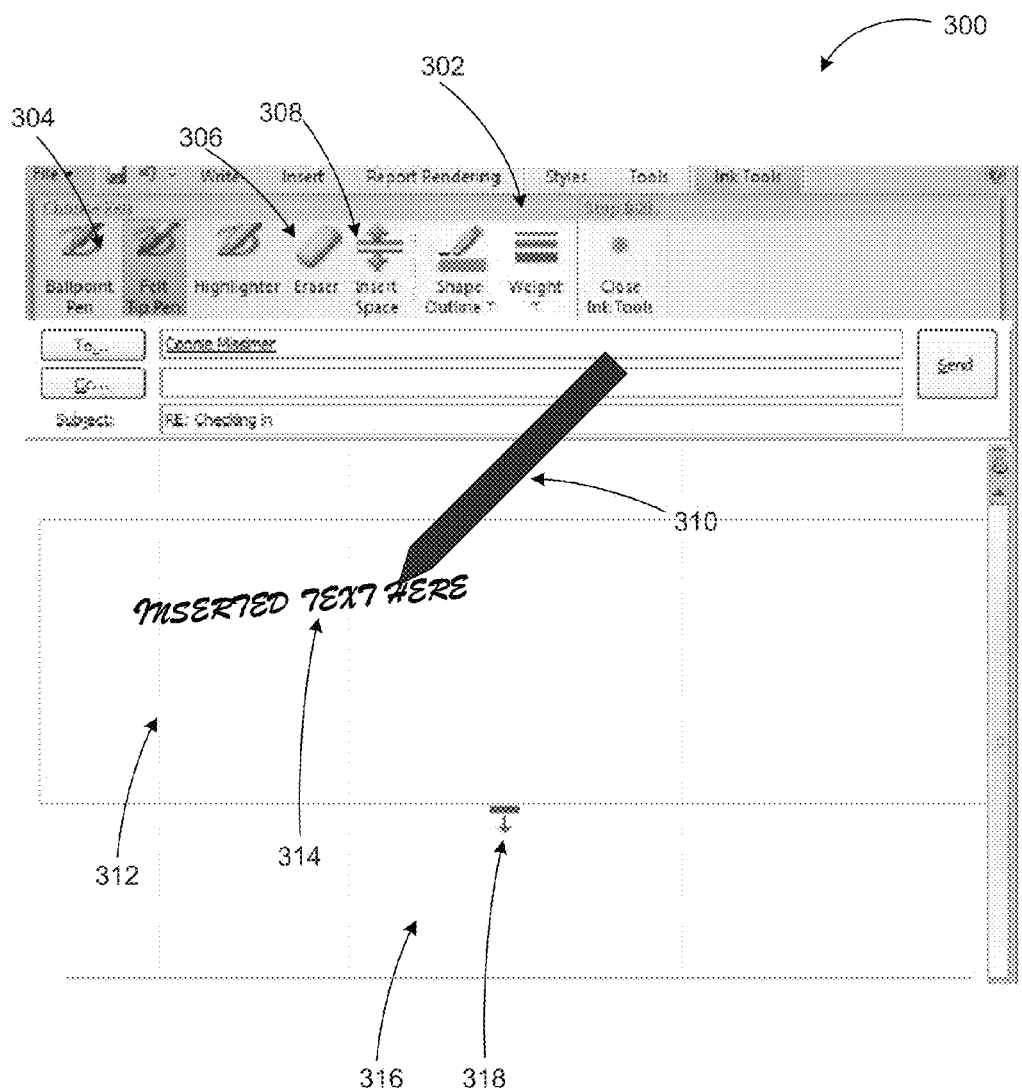
FIG. 3 illustrates a screenshot of an example text-based application with an inking canvas.

FIG. 3 illustrates a screenshot of example text-based application 300 with an inking canvas. Example application 300 is an electronic mail application. The user interface for the application includes a command area commonly referred to as menu bar or ribbon that includes drop-down menu headers as well as icons for specific commands. In an inking application, items of the menu bar or ribbon can typically be activated by an inking pen.

In addition to drop-down menu headers such as write, insert, report rendering, and the like, ribbon 302 includes icons 304 for selecting an inking pen type, icon 306 for converting the inking pen to an eraser, and icon 308 for inserting canvas space on command.

Inking pen (sometimes referred to as stylus) 310 is used to provide characters, symbols, and graphics on a touch-sensitive display within a canvas (e.g. canvas 312). The user interface for electronic mail application (300) includes the document page 316, which is a message page for preparing an electronic message to be sent. In other applications, the document page may be any part of a document being processed by the application such as a word processing document page, a calendar page, a contact information card, and the like.

Document page 316 may include a presented canvas specifically dedicated for inking, and a non-canvas area for typed text, graphics, predetermined information, and the like. The term "presented canvas" refers to a displayed area that can accept inking with an application User Interface (UI). On the other hand, the term "real canvas" refers to an actual portion of the UI that can accept ink entries regardless of whether that area is visibly indicated or not.

For example, in an electronic mail document page, a signature portion with information about the user may include predetermined text such as phone number, address, and the like, as well as a graphic representation of the user's signature. The same document page may also include a presented canvas area for the user to provide the message in handwriting (possibly later to be recognized). Inked text 314 is an example of such handwritten ink entry. If the UI of the electronic mail application accepted ink entries outside the visible "presented canvas", it would have a real canvas that is larger than its presented canvas.

Embodiments are not limited to dedicated canvas areas and non-canvas areas, however. Mixed use canvases that may include typed text (or graphics) as well as inked entry may also be implemented using the principles described herein.

Canvas size control icon 318 is a special command area within the user interface arranged to control a size of the presented canvas (312) by inking pen activation. If a user presses on the canvas size control icon 318 and drags up or down (or in other directions), the canvas size grows or reduces in that direction.

In typical inking applications, the real canvas size is the same as the size of the presented canvas (312). This presents a problem when a user enters an ink stroke that exceeds the presented canvas or is totally outside the presented canvas. Some solutions include growing the canvas in the direction of the stroke (if it starts within the canvas) allowing the user to re-enter the stroke once the canvas is grown, but the original ink stroke is lost.

Figure 4:
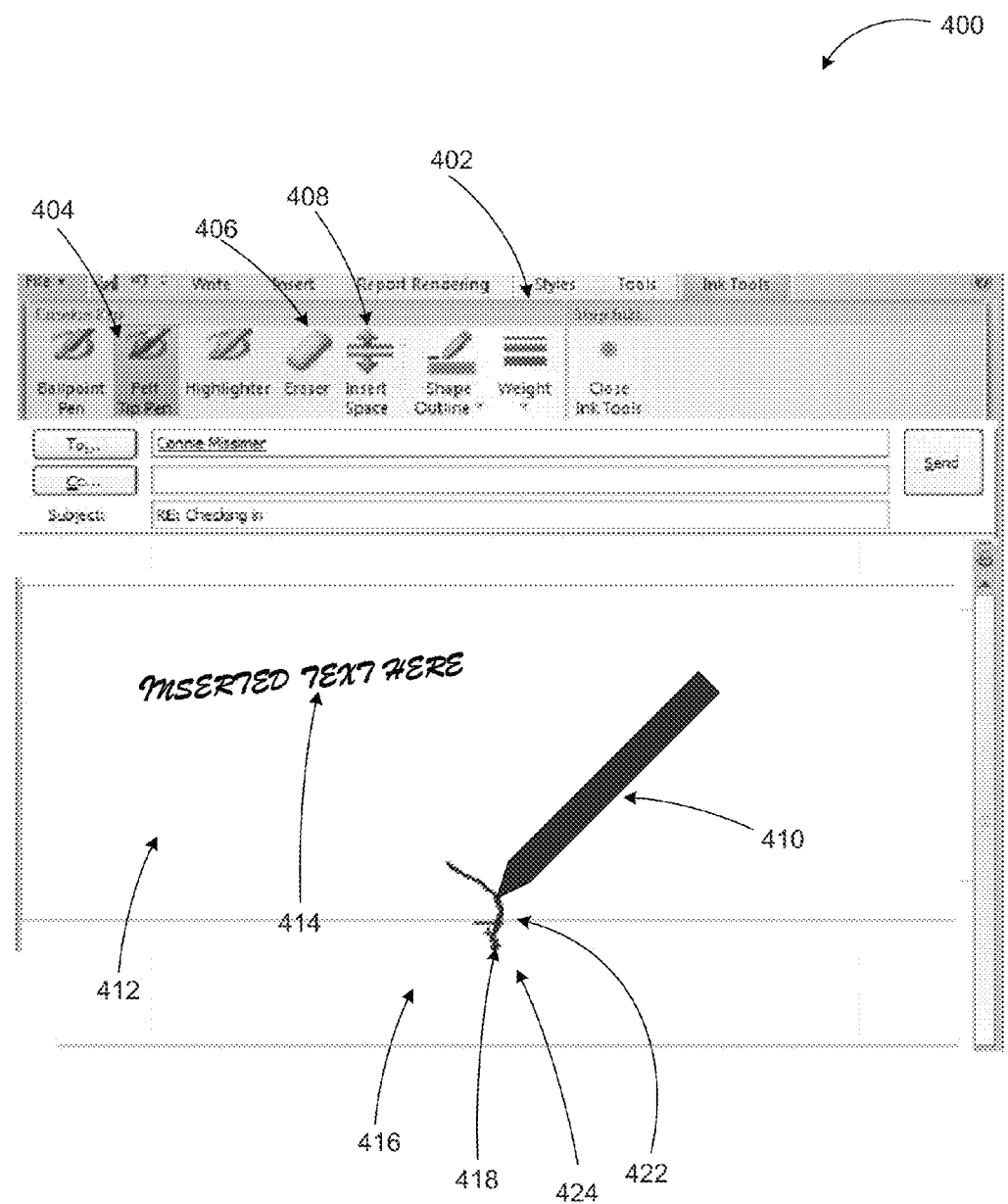
FIG. 4 illustrates a screenshot of the example text-based application of FIG. 3 with a stroke exceeding the canvas area.

FIG. 4 illustrates a screenshot of the example text-based application of FIG. 3 with a stroke exceeding the canvas area. In example application 400, items similarly numbered as in FIG. 3, operate in a likewise manner. Thus, command icons 404, 406, 408 in ribbon 402, as well as canvas size control icon 418 operate similarly as described in FIG. 3. Document page 416 includes presented canvas area 412 with inked text 414 and non-inking area 416.

As described above, the portion (424) of ink stroke 422, that is outside canvas 412, is lost in typical inking applications regardless of whether the canvas is grown based on the ink stroke exceeding the presented canvas area or not.

According to one embodiment, the whole document page 416 may be designated as canvas area instead of just the presented canvas area 412. Thus, ink stroke 422 may be recorded in whole when it is entered regardless of where it originates. The presented canvas area 412 may still be shown as such to provide a visual separation between other areas and the inking area, but ink strokes outside presented canvas 412 (with the exception of command areas such as ribbon 402, canvas size control icon 418, etc.) are not lost. The step following recording of the ink stroke 422 is described below.

Figure 5:
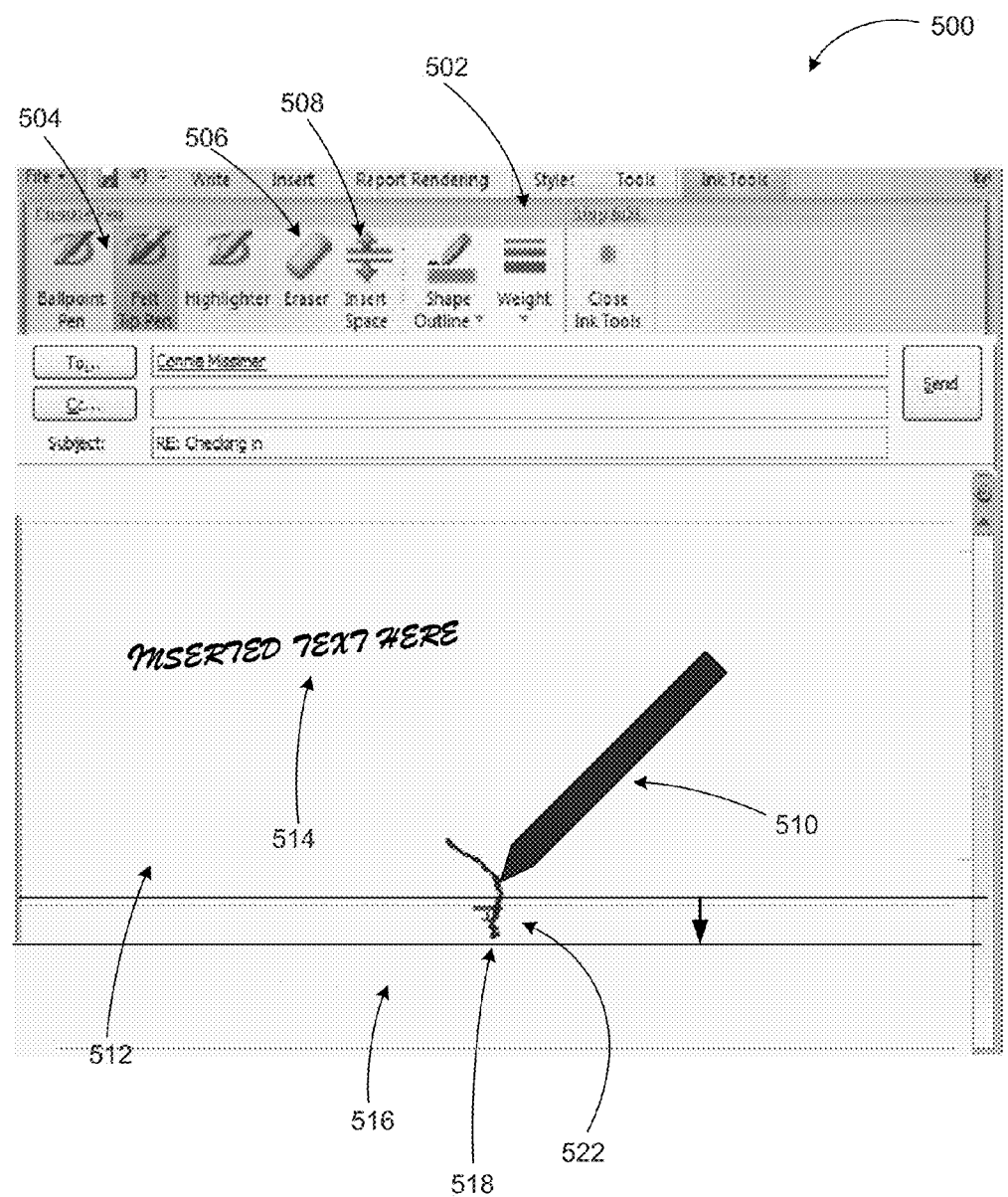
FIG. 5 illustrates a screenshot of the example text-based application of FIG. 4 with the canvas area dynamically expanding based on the stroke.

FIG. 5 illustrates a screenshot of the example text-based application of FIG. 4 with the canvas area dynamically expanding based on the stroke.

In example application 500, items similarly numbered as in FIG. 4, operate in a likewise manner. Thus, command icons 504, 506, 508 in ribbon 502, as well as canvas size control icon 518 operate similarly as described in FIGS. 3 and 4. Document page 516 includes presented canvas area 512 with inked text 514 and non-inking area 516.

Following recording of ink stroke 522 that exceeds the original presented canvas area, presented canvas area 512 is dynamically grown to cover ink stroke 522. Any items in the non-inking area 516 may be pushed downward or upward depending on the user interface configuration.

While the screenshot in FIG. 5 shows growth of a presented canvas area in the direction of an ink stroke originating within the presented canvas area, embodiments are not so limited. Other embodiments may include presented canvas area being dynamically enlarged to cover an ink stroke that is wholly outside the canvas area. Further embodiments may include enlarging of the application user interface along with the presented canvas area to cover an ink stroke that is even outside the user interface.

Moreover, the presented canvas may be grown in any direction. In typical settings, the presented canvas area may be implemented as a horizontal band within the document page of the application, but other configurations of size and shape of canvas areas and their growth to cover the ink stroke may also be implemented using the principles described herein.

Figure 6:
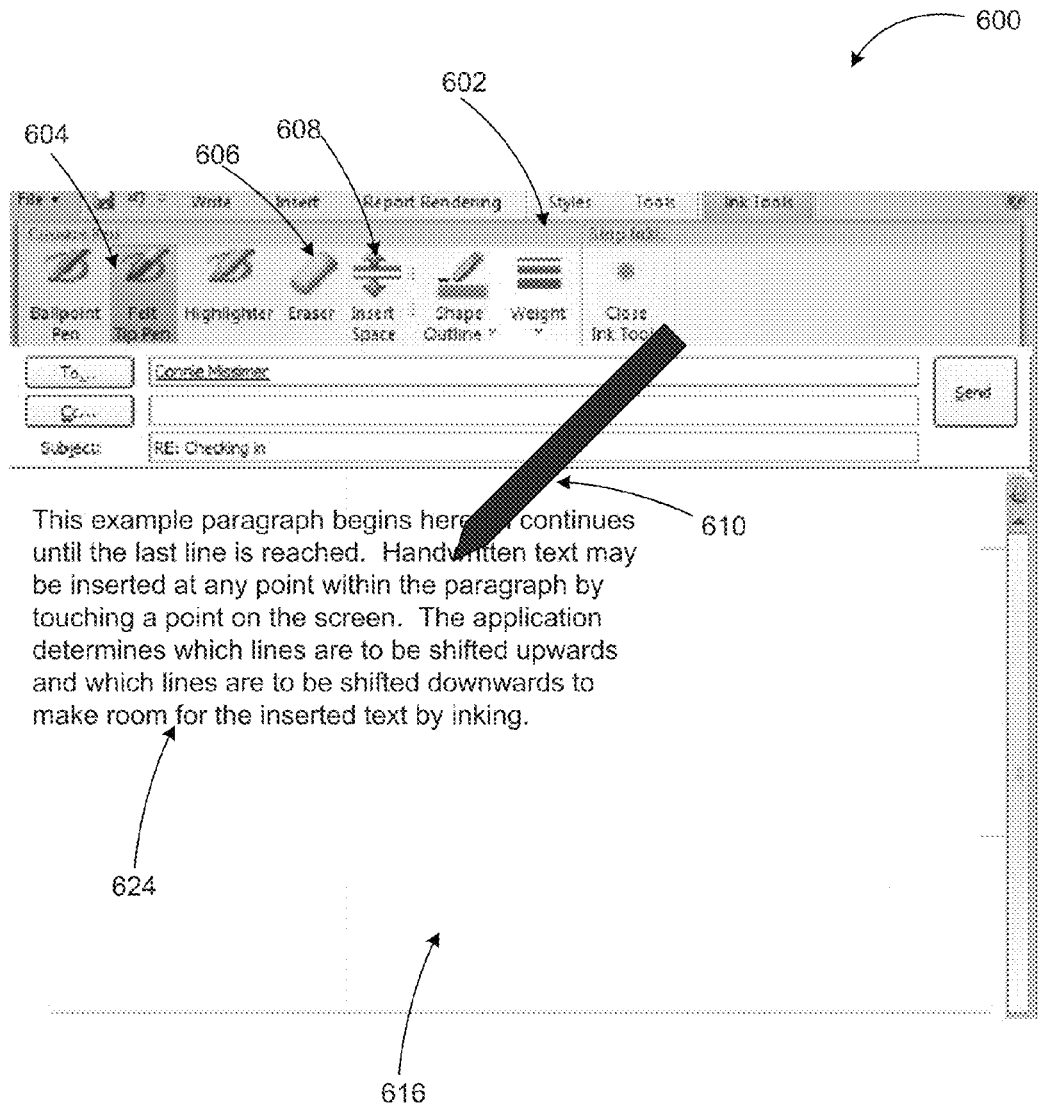
FIG. 6 illustrates a screenshot of another example text-based application with typed text and an inking pen attempting to begin inking in the typed text area.

FIG. 6 illustrates a screenshot of another example text-based application with typed text and an inking pen attempting to begin inking in the typed text area.

In example application 600, items similarly numbered as in FIGS. 3, 4, and 5, operate in a likewise manner. Thus, command icons 604, 606, 608 in ribbon 602 operate similarly as described in conjunction with previous figures. In this case, document page 616 includes typed text 624.

There are many scenarios, where a user may desire to insert ink entry between typed text. For example, the user may desire to edit a document, edit an inked text that has already been recognized and converted to regular text, add a hand drawn figure or diagram to a document, add a map to a document, and the like.

In such a scenario, the user may indicate inking mode over typed text by inserting an ink stroke at a point on typed text 624 with inking pen 610. In some embodiments, the user may indicate inking mode by clicking on a soft or hard button, or by a keyboard entry, then indicate the point of insertion again by touching a selected point on typed text 624.

Figure 7:
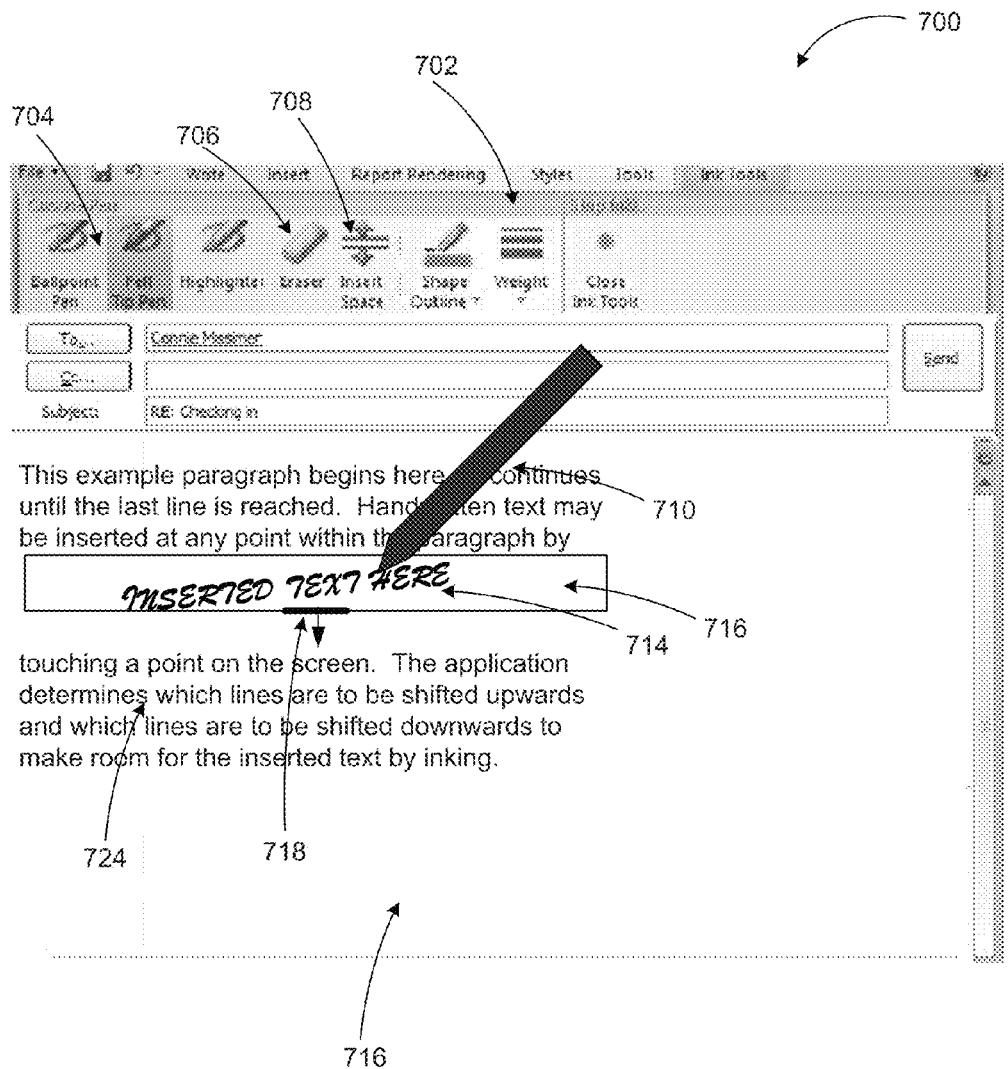
FIG. 7 illustrates a screenshot of the example text-based application of FIG. 6 with an inking canvas inserted in the typed text area.

FIG. 7 illustrates a screenshot of the example text-based application of FIG. 6 with an inking canvas inserted in the typed text area in response to the inking mode indication.

As in previous figures, similarly numbered items operate in a likewise manner. Upon receiving the inking mode indication, the inking application may freeze the lines in some embodiments to preserve text attributes such as line lengths. Yet, in other embodiments, ink anchoring may be done without freezing the lines. Lines may be separated based on the insertion point of inking mode indication. If the insertion point is between two lines, the lines may be separated based on a length of the first ink stroke or by a default distance. If the insertion point is on a line, a dynamic decision process may be followed, where the application determines which two lines to separate based on a number of lines in the paragraph, location of the insertion point relative to a line center, and the like.

In one embodiment, the user may be asked to select which lines to separate. In another embodiment, the line itself may be separated as the canvas is inserted.

Once new canvas 716 is inserted inked entry 714 may be accepted. If the inked entry exceeds the initial size of new canvas 716, the canvas may be dynamically grown as described previously. The canvas may also include canvas size control icon 718 for the user to adjust the canvas size manually.

Figure 8:
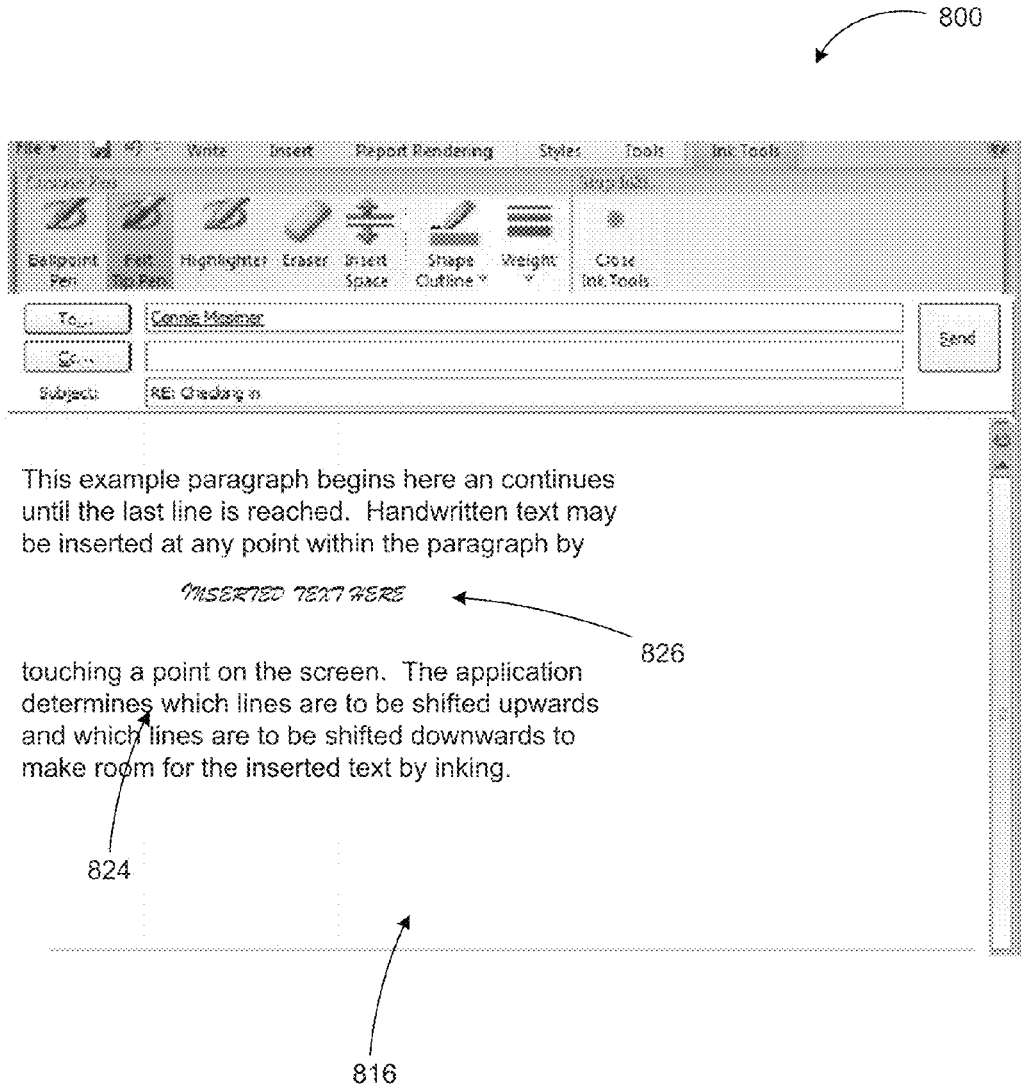
FIG. 8 illustrates a screenshot of the example text-based application of FIG. 6 with inked text integrated into the typed text.

FIG. 8 illustrates a screenshot of the example electronic mail application of FIG. 7 with inked text integrated into the typed text.

Following the operations described in conjunction with FIGS. 6 and 7, inked entry 826 may be recognized and integrated into the existing typed text (824). The integration operation may include inheriting attributes of typed text 824, such as font type, font size, line length, and the like, to inked entry 826.

Separation distance between the lines where the new canvas was inserted may also be readjusted to reflect line spacing of the paragraph. Once the optional integration process is complete, the example electronic mail application may perform other actions such as sending a message, performing a spell-check and the like.

Figure 9:
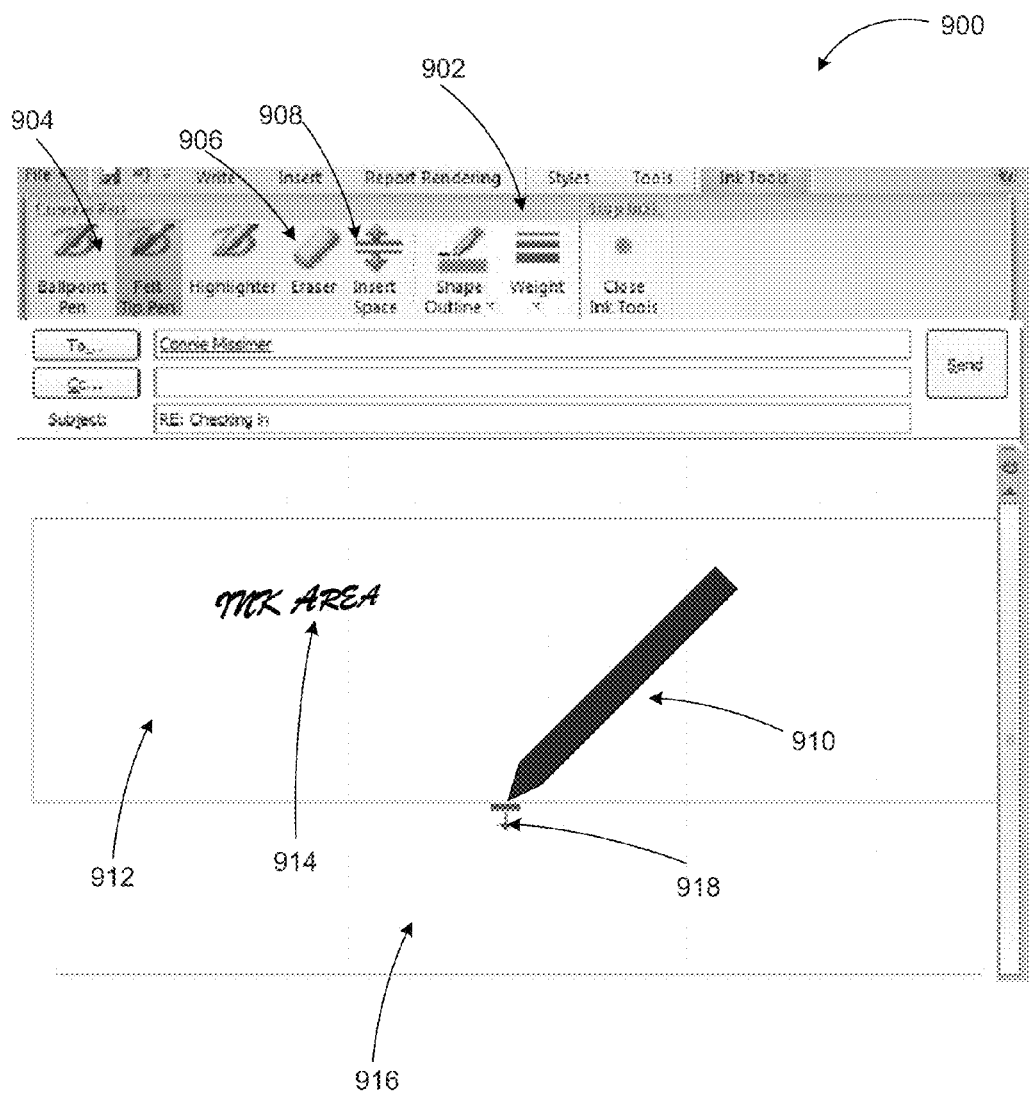
FIG. 9 illustrates a screenshot of a further example text-based application where the inking pen is used to enter commands instead of inking text.

FIG. 9 illustrates a screenshot of a further example electronic mail application where the inking pen is used to enter commands instead of inking text.

Items on the user interface of electronic mail application 900, as command icons 904, 906, and 908 of ribbon 902, operate similar to likewise numbered items in previous figures. The document page of electronic mail application 900 is shown with presented canvas area 912, inked entry 914, non-inking area 916, and canvas size control icon 918.

When an ink stroke by inking pen 910 is detected, the application first determines where the ink stroke begins. If the ink stroke begins on a command area such as one of the command icons in ribbon 902 or canvas size control icon 918, a determination is made that a command is to be executed. The application then determines what the command is and how it is to be executed (e.g. parameters).

In the example of canvas size control icon 918, by clicking on the icon the user is indicating that the canvas size is to be modified. A direction of the stroke indicates whether the canvas is to be grown or reduced. A length of the stroke indicates by what amount the canvas size is to be adjusted.

While FIG. 9 shows the canvas area covering a horizontal band along the complete width of the document page, presented canvas area 912 may be in any shape or size. Accordingly canvas size control icon 918 may control the size of the canvas in any direction. For example, the canvas area may be a rectangle in the middle of the document page that can be grown in any one of the four directions.

While example text-based applications and inking elements, such as canvas areas, in above figures are shown with limited elements, other implementations may include additional elements. Other applications, canvas shapes and sizes, command icons, and the like may be implemented using the principles described herein.

Figure 10:
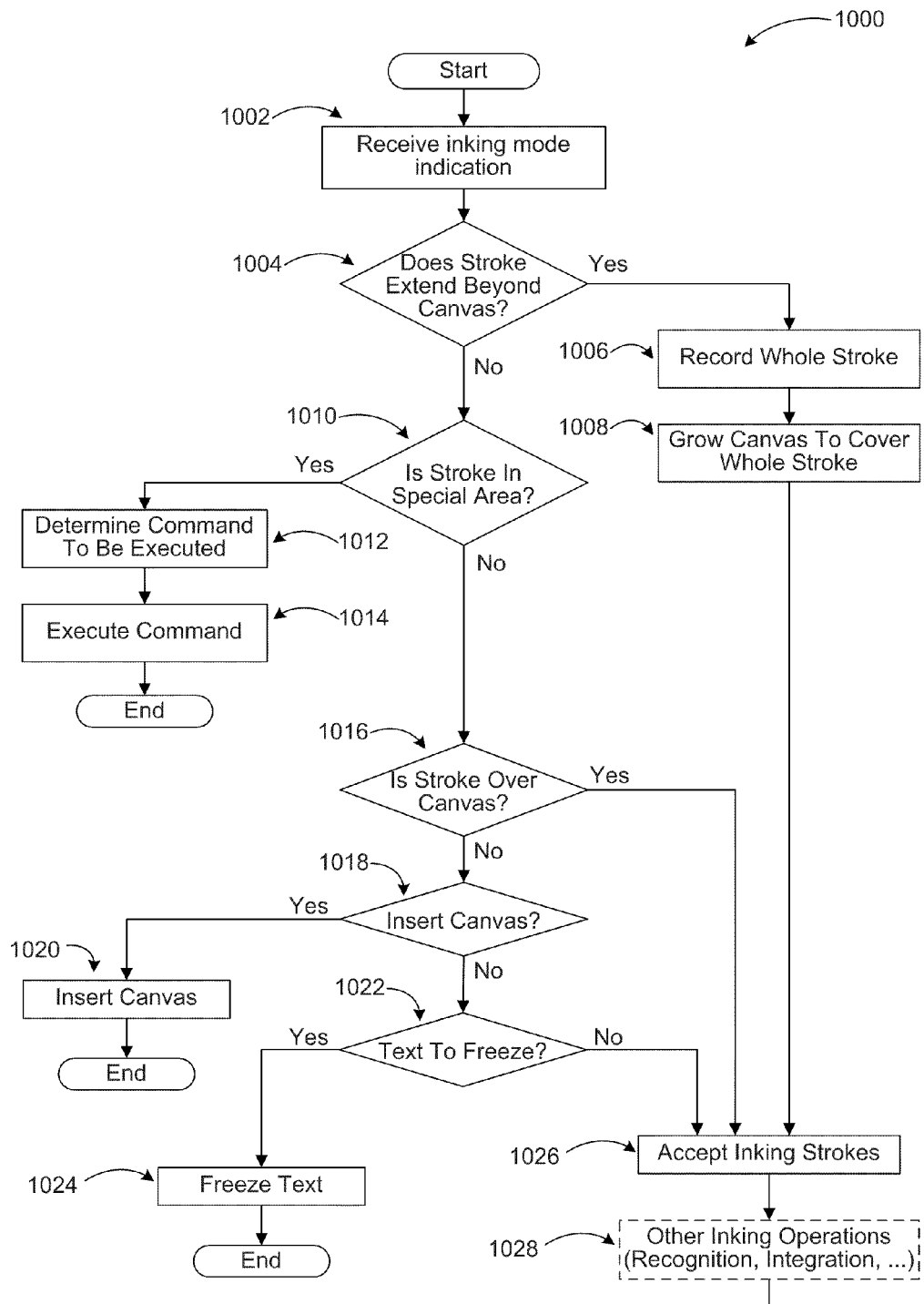
FIG. 10 illustrates a logic flow diagram for a process of creating and manipulating an inking canvas based on ink strokes.

FIG. 10 illustrates a logic flow diagram for a process of creating and manipulating an inking canvas based on ink strokes.

Process 1000 begins at operation 1002, where an inking mode indication is received. The inking mode indication may be touching of a presentation surface (e.g. document page) by the inking pen, clicking of a soft button or a hard button, a keyboard entry, and the like. Once the inking mode indication is received the inking application makes a series of determinations. Processing flows from operation 1002 to decision operation 1004, where the first of the determinations is made.

At decision operation 1004, a determination is made whether the inking stroke (if the indication is an inking stroke) extends beyond the canvas. In some embodiments the inking stroke may begin within the canvas and extend beyond it. In other embodiments, the whole stroke may be outside the visible canvas area. If the stroke extends beyond the visible canvas area (or is wholly outside), processing moves to operation 1006. If the determination is negative, processing continues to decision operation 1010.

At operation 1006, the whole stroke is recorded regardless of whether part or all of it is within the visible canvas area. Processing moves from operation 1006 to operation 1008.

At operation 1008, the visible canvas area is grown to cover the whole recorded stroke. In the most general sense, the visible canvas area may be grown in any direction. In some embodiments, where the visible canvas covers a horizontal band along the entire presentation (document page), the canvas may be grown in a vertical direction to cover the added stroke. Processing advances from operation 1008 to operation 1026 where inking strokes are accepted.

At decision operation 1010, following a negative determination at decision operation 1004, a determination is made whether the stroke is in a special area. Special areas are typically dedicated portions of the presentation surface indicated by an icon or a soft button. For example, the canvas area control icon may control the growth of the canvas in a direction. Other examples include command buttons in a menu bar or ribbon, and the like. If the stroke is in a special area, processing moves to operation 1012. Otherwise, processing continues to decision operation 1016.

At operation 1012, the command to be executed is determined. In the example of the canvas area control icon, the stroke may indicate growing the canvas area in a vertical direction by an amount indicated by the length of the stroke. In the example of the command buttons, any one of the commands such as change font color, highlight, and the like, associated with the inking application may be selected for execution. Processing moves from operation 1012 to operation 1014.

At operation 1014, the determined command is executed. For example, the visible canvas area is grown in the direction and by the amount indicated by the stroke. Processing returns to a calling process for further actions after operation 1014.

At decision operation 1016, following a negative determination at decision operation 1010, a determination is made whether the stroke is over a canvas area. If the stroke is over the canvas area, processing advances to operation 1026 where the inking stroke is accepted. If the stroke is not over the canvas area, processing moves to decision operation 1018.

At decision operation 1018, a determination is made whether a canvas is to be inserted. The decision may be based on a mode that the application is in such as continued inking mode or a location of the inking stroke such as designated area(s) in the application UI. If the canvas is to be inserted processing moves to operation 1020 where the canvas is inserted and its size adjusted according to a default parameter or a location and/or size of the ink stroke. If the canvas is not to be inserted, processing continues to decision operation 1022.

At decision operation 1022, a determination is made whether text is to be frozen. The ink stroke may be in a typed text area. Typed text area contains text already entered by keyboard strokes or other means such as copying. If the text is to be frozen, processing advances to operation 1024 where text is frozen. Freezing the text may enable preservation of text attributes such as line lengths, font size and type, line spacing, and the like. In other embodiments, ink anchoring may be performed without freezing the text. Processing proceeds to a calling process for further actions after operation 1024.

If the determination at decision operation 1022 is negative, processing advances to operation 1026 where the ink stroke is accepted. As inking entries are made, canvas size may be grown or shrunk (grown in positive or negative direction) as described above. Processing advances from operation 1026 to optional operation 1028.

At optional operation 1028, other inking operations such as character recognition, integration of recognized text to typed text, and the like, are performed. After optional operation 1024, processing moves to a calling process for further actions.

The operations included in process 1000 are for illustration purposes. Creating and manipulating canvases based on ink strokes may be implemented by a similar process with fewer or additional steps, as well as in different order of operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to be executed at least in part in an inking application for creating and manipulating a canvas, the method comprising:
receiving an inking mode indication comprising an ink stroke, the ink stroke being a type of stroke enabled to specify canvas area expansion;
designating an entire user interface of an application as a canvas area;
determining a canvas area anchor point; and
inserting, if the canvas area anchor point is in an acceptable location, a presented canvas area within the designated canvas area providing visual separation between an inking area and the designated canvas area, the presented canvas area originating at the canvas area anchor point and extending in a direction of the ink stroke, wherein the presented canvas area expansion is at least vertical in part without creating multiple vertical lines of ink stroke text.

2. The computer-implemented method of claim 1, wherein inserting, if the canvas area anchor point is in the acceptable location, the presented canvas area comprises inserting the presented canvas in the acceptable location comprising at least one from a set of a typed text area, a presented canvas area, and an area outside the presented canvas area.

3. The computer-implemented method of claim 1, wherein determining the canvas area anchor point comprises determining the canvas area anchor point based on the ink stroke.

4. The computer-implemented method of claim 3, further comprising determining a separation location and a separation distance between typed text lines based on an initial point and a length of the ink stroke, if the canvas area anchor point is in the typed text area.

5. The computer-implemented method of claim 1, further comprising adjusting a size of the presented inserted canvas area based on one of a size of the ink stroke and an input detected by a canvas control icon.

6. The computer-implemented method of claim 1, wherein receiving the inking mode indication comprises receiving the ink stroke as the inking mode indication.

7. The computer-implemented method of claim 1, further comprising determining a command to be executed if the ink stroke is initiated on a command area.

8. The computer-implemented method of claim 7, further comprising receiving the ink stroke in the command area, the command area comprising a canvas size control icon.

9. The computer-implemented method of claim 7, wherein the command area further includes a soft button associated with the inking application user interface.

10. The computer-implemented method of claim 1, further comprising modifying a size of the presented canvas based on a length and the direction of the ink stroke.

11. The computer-implemented method of claim 1, wherein the inking application includes at least one of from a set of: a word processing application, a presentation application, a spreadsheet application, a calendar application, a graphics application, a diagram application, and an electronic mail application.

12. The computer-implemented method of claim 1, wherein receiving the inking mode indication comprises receiving at least one from a set of: an inking pen stroke, a touch screen activation, activation a soft button, activation of a hard button, a mouse entry, and a keyboard entry.

13. A non-transitory computer readable storage medium having a set of computer executable instructions that, when executed by at least one processor, perform a method for creating and manipulating a canvas, the method comprising:
receiving an ink stroke;
designating an entire user interface of an application as a canvas area;
determining that the ink stroke corresponds to a specified type of stroke indicative of a canvas area expansion action;
determining a canvas area anchor point based on a location of the ink stroke;
determining a canvas size based on a size of the ink stroke; and
inserting, if the canvas area anchor point is in an acceptable location, a presented canvas area within the designated canvas area providing visual separation between an inking area and the designated canvas area an application user interface, the presented canvas area being based on a direction of the ink stroke, wherein the presented canvas area expansion is at least vertical in part without creating multiple vertical lines of ink stroke text.

14. The non-transitory computer readable storage medium of claim 13, wherein inserting, if the canvas area anchor point is in the acceptable location, the presented canvas area comprises inserting the presented canvas in the acceptable location comprising at least one from a set of a typed text area, the presented canvas area, and an area outside the presented canvas area.

15. The non-transitory computer readable storage medium of claim 13, further comprising determining a command to be executed if the ink stroke is initiated on a command area.

16. The non-transitory computer readable storage medium of claim 13, wherein determining the canvas size based on the size of the ink stroke comprises determining the canvas size based on the length and a direction of the ink stroke.

17. The non-transitory computer readable storage medium of claim 13, further comprising receiving an inking mode indication, the inking mode indication comprising at least one from a set of: an inking pen stroke, a touch screen activation, activation a soft button, activation of a hard button, a mouse entry, and a keyboard entry.

18. A system for creating and manipulating a canvas, the system comprising:
a memory storage; and
a processing unit coupled to the memory storage, wherein the processing unit is configured to:
receive an inking mode indication,
designating an entire user interface of an application as a canvas area;
receive an ink stroke in the user interface of the application, the ink stroke being of a predetermined stroke type configured to trigger canvas area expansion,
determine a canvas area anchor point based on a location of the ink stroke,
when the canvas area anchor point is in an acceptable location:

inserting the a presented canvas at the acceptable location within the designated canvas area providing visual separation between an inking area and the designated canvas area, and extending the presented canvas in a direction of the ink stroke, wherein the canvas area expansion is at least vertical in part without creating multiple vertical lines of ink stroke text, and when the canvas area anchor point is in a command area, executing a command associated with the ink stroke.

19. The system of claim 18, wherein the acceptable location includes at least one from a set of a typed text area, the presented canvas area, and an area outside the presented canvas area.

20. The system of claim 18, further comprising determining the canvas size based on the based on a length of the ink stroke and a direction of the ink stroke.

* * * * *